(12) United States Patent
Kim

(10) Patent No.: US 10,634,045 B1
(45) Date of Patent: Apr. 28, 2020

(54) FUEL AND WATER INJECTION SYSTEM AND METHOD FOR CONTROLLING THE SAME

(71) Applicants: HYUNDAI MOTOR COMPANY, Seoul (KR); KIA MOTORS CORPORATION, Seoul (KR)

(72) Inventor: Jang Hun Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 21 days.

(21) Appl. No.: 16/202,664

(22) Filed: Nov. 28, 2018

(30) Foreign Application Priority Data

Oct. 31, 2018 (KR) .................... 10-2018-0131651

(51) Int. Cl.
*F02M 25/022* (2006.01)
*F02B 47/02* (2006.01)
*F02D 41/00* (2006.01)
*F02C 3/30* (2006.01)

(52) U.S. Cl.
CPC .......... *F02B 47/02* (2013.01); *F02D 41/0025* (2013.01); *F02M 25/0221* (2013.01); *F02M 25/0227* (2013.01); *F02C 3/30* (2013.01)

(58) Field of Classification Search
CPC .... F02B 47/02; F02B 17/005; F02D 41/0025; F02M 25/0221; F02M 25/0227; F23L 2900/07008; F02C 3/30
See application file for complete search history.

(56) References Cited

U.S. PATENT DOCUMENTS

| 5,125,366 | A | * | 6/1992 | Hobbs | F02B 47/02 123/25 C |
| 5,174,247 | A | * | 12/1992 | Tosa | F02B 47/02 123/25 C |
| 5,875,743 | A | * | 3/1999 | Dickey | F02B 1/12 123/25 C |
| 10,458,365 | B2 | * | 10/2019 | Steiner | F02M 25/0222 |

FOREIGN PATENT DOCUMENTS

| KR | 10-0626403 B1 | 9/2006 |
| KR | 10-2007-0087026 | 8/2007 |
| WO | 2006/092887 A1 | 9/2006 |

* cited by examiner

*Primary Examiner* — Syed O Hasan
(74) *Attorney, Agent, or Firm* — Brinks Gilson & Lione

(57) ABSTRACT

A fuel and water injection system includes: an injector having a needle which is movable upwardly and downwardly by a solenoid coil, a nozzle orifice which is opened and closed by upward and downward movements of the needle, and a pressure chamber communicating with the nozzle orifice; a fuel pump supplying fuel to the pressure chamber; a water pump supplying water to the pressure chamber; a solenoid shut-off valve disposed on a water supply pipe connecting the water pump and the injector; an engine control unit (ECU) controlling the fuel pump and the injector; and a water supply controller controlling the water pump and the solenoid shut-off valve.

5 Claims, 7 Drawing Sheets

FUEL AND WATER INJECTION SYSTEM AND METHOD FOR CONTROLLING THE SAME

CROSS-REFERENCE TO RELATED APPLICATION

This application claims priority to and the benefit of Korean Patent Application No. 10-2018-0131651, filed on Oct. 31, 2018, the entire contents of which are incorporated herein by reference.

FIELD

The present disclosure relates to a fuel and water injection system and a method for controlling the same, and more particularly, to a fuel and water injection system and a method for controlling the same.

BACKGROUND

The statements in this section merely provide background information related to the present disclosure and may not constitute prior art.

Various techniques have been researched and developed for reducing combustion heat during combustion in an internal combustion engine of a vehicle to reduce emissions such as nitrogen oxides ($NO_x$), and reducing a mixture ratio of air and fuel to improve fuel efficiency.

As representative techniques for reducing combustion heat and $NO_x$ emissions and improving fuel efficiency, an exhaust gas recirculation (EGR) system, a water injection system, emulsion fuel, $CO_2$ capture and injection, and the like have been researched and developed.

The EGR system may include an EGR pipe for circulating EGR gas from an exhaust system to an intake system, an EGR cooler for cooling temperature of the EGR gas, and an EGR valve for regulating the flow of the EGR gas, so that it may occupy a relatively large installation space in a narrow engine room and the assembly cost may be increased.

In addition, the EGR system may only operate in a portion of an operating range of the vehicle and operate depending on RPM of the engine, so that the range of use of the EGR gas may be very limited. For example, the operation of the EGR system may not be smoothly performed in a low RPM region and a high RPM region of the engine.

The water injection system may be configured to spray water into the incoming air or fuel-air mixture, or directly into a combustion chamber of the engine. Water injection may lower the temperature of the combustion chamber, reduce emissions of $NO_x$, hydrocarbons, and the like, and reduce the mixture ratio of air and fuel to thereby improve fuel efficiency.

Recently, a fuel and water injection system in which fuel and water are supplied to a single injector and the injector injects the fuel and the water together into the combustion chamber of the engine has been researched and developed.

In a conventional fuel and water injection system, however, a mixture of water and fuel remaining in the injector may be collected (circulated) in a fuel tank through a return passage connected to the injector, so that the water-fuel mixture may gradually increase in the fuel tank as the operating time elapses. We have discovered that even when the injection of fuel alone is desired in a full load operating condition, or the like, the water together with the fuel may be injected, which lowers the combustion efficiency.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a fuel and water injection system and a method for controlling the same, capable of reducing NOx emissions and improving combustion performance by selectively injecting fuel alone or injecting fuel and water together according to operating conditions of an engine.

According to an aspect of the present disclosure, a fuel and water injection system may include: an injector having a needle which is movable upwardly and downwardly by a solenoid coil, a nozzle orifice which is opened and closed by upward and downward movements of the needle, and a pressure chamber communicating with the nozzle orifice; a fuel pump supplying a fuel to the pressure chamber of the injector; a water pump supplying water to the pressure chamber of the injector; a solenoid shut-off valve disposed on a water supply pipe connecting the water pump and the pressure chamber of the injector; an engine control unit (ECU) controlling the fuel pump and the injector; and a water supply controller configured to control the water pump and the solenoid shut-off valve, wherein the water supply controller is configured to selectively open and close the solenoid shut-off valve based on operating conditions of an engine, so that the fuel and water injection system may selectively operate in a fuel injection mode in which the injector injects only the fuel, or in a fuel and water injection mode in which the injector injects the fuel and the water together.

The water supply controller may be configured to supply the water to the pressure chamber when a pressure in the pressure chamber is lower than a predetermined first pressure, the predetermined first pressure is equal to a injection pressure.

The ECU may be configured to drive the solenoid coil according to a first predetermined duty cycle, and the water supply controller may be configured to drive the solenoid shut-off valve according to a second predetermined duty cycle.

The water supply controller may turn on the solenoid shut-off valve during a turn-off period of the solenoid coil.

A pulse width of the first predetermined duty cycle may be greater than a pulse width of the second predetermined duty cycle.

One injection cycle of the injector may include a first injection period in which a fuel injection rate increases, a second injection period in which the fuel injection rate is maintained at a predetermined peak fuel injection rate, and a third injection period in which the fuel injection rate decreases. When the system operates in the fuel and water injection mode, the water supply controller may open the solenoid shut-off valve in the third injection period of one injection cycle so that the water may be supplied to the pressure chamber in the third injection period of one injection cycle, and the ECU may drive the solenoid coil of the injector according to a first predetermined duty cycle so that the water supplied to the pressure chamber may be injected together with the fuel supplied to the pressure chamber through the nozzle orifice of the injector in the first injection period and the second injection period of a next injection cycle.

The system may further include a check valve inhibiting or preventing the water from flowing back from the pressure chamber to the water pump, wherein the check valve may be disposed between the pressure chamber and the water pump.

The pressure chamber may have a fuel inlet and a water inlet, and the check valve may be mounted on a portion facing the water inlet.

According to another aspect of the present disclosure, a method for controlling a fuel and water injection system, the system including an injector having a needle which is movable upwardly and downwardly by a solenoid coil, a nozzle orifice which is opened and closed by upward and downward movements of the needle, and a pressure chamber communicating with the nozzle orifice; a fuel pump supplying a fuel to the pressure chamber of the injector; a water pump supplying water to the pressure chamber of the injector; a solenoid shut-off valve disposed on a water supply pipe connecting the water pump and the injector; an ECU controlling the fuel pump and the injector; and a water supply controller controlling the water pump and the solenoid shut-off valve, may include: driving the solenoid coil of the injector in accordance with a first duty cycle, and turning on the water pump and driving the solenoid shut-off valve in accordance with a second duty cycle when an engine speed is lower than or equal to a first predetermined speed or an engine load is lower than or equal to a first predetermined load, thereby allowing the system to operate in fuel and water injection mode in which the injector injects the fuel and the water together; and driving the solenoid coil of the injector in accordance with the first duty cycle, and turning off the water pump and closing the solenoid shut-off valve when the engine speed exceeds the first predetermined speed or the engine load exceeds the first predetermined load, thereby allowing the system to operate in fuel injection mode in which the injector injects only the fuel.

The method may further include: driving the solenoid coil of the injector in accordance with the first duty cycle, and turning on the water pump and driving the solenoid shut-off valve in accordance with the second duty cycle when a coolant temperature is greater than or equal to a predetermined temperature, thereby allowing the system to operate in the fuel and water injection mode.

The method may further include: driving the solenoid coil of the injector in accordance with the first duty cycle, and turning off the water pump and closing the solenoid shut-off valve when a coolant temperature is lower than a predetermined temperature, thereby allowing the system to operate in the fuel injection mode.

The fuel and the water may be purged from the injector by turning off the water pump and closing the solenoid shut-off valve, and driving the solenoid coil of the injector in accordance with a predetermined duty cycle when an engine is stopped.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
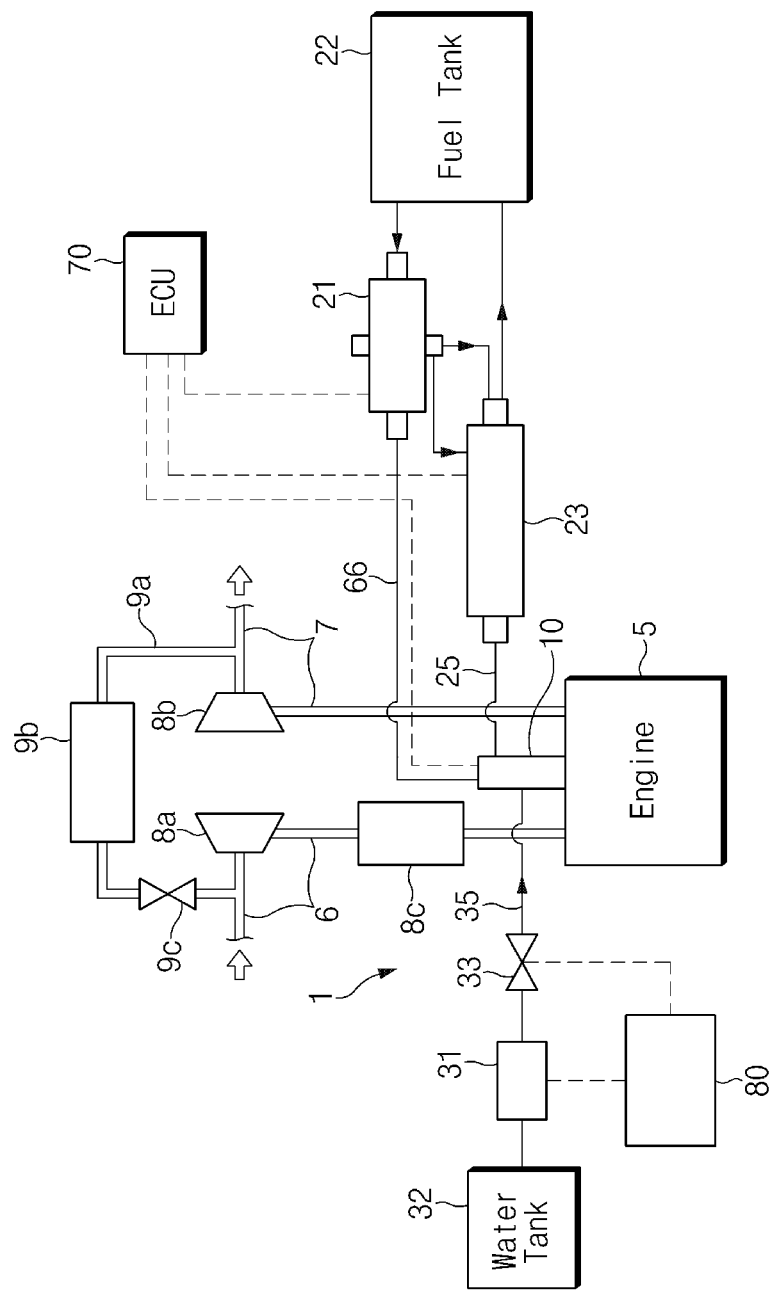
FIG. 1 illustrates the configuration of a fuel and water injection system according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
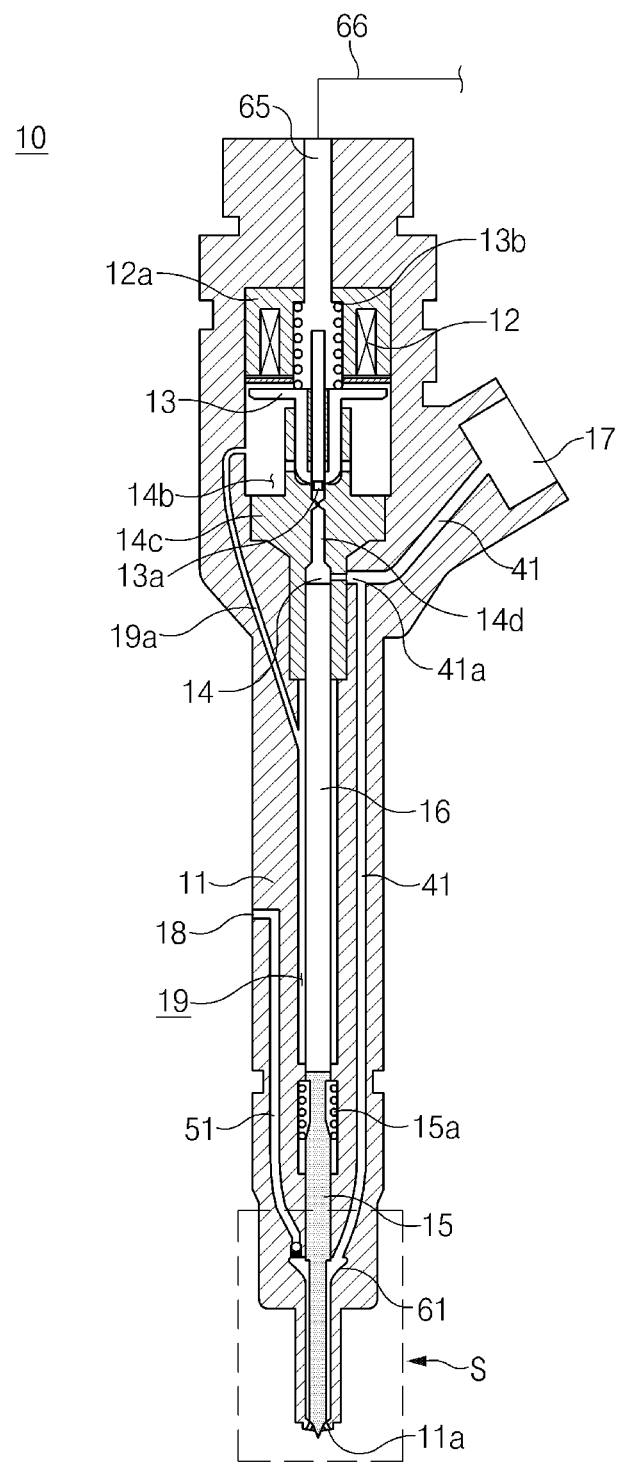
FIG. 2 illustrates a cross-sectional view of an injector in a fuel and water injection system according to an exemplary form of the present disclosure.
Figure 3:
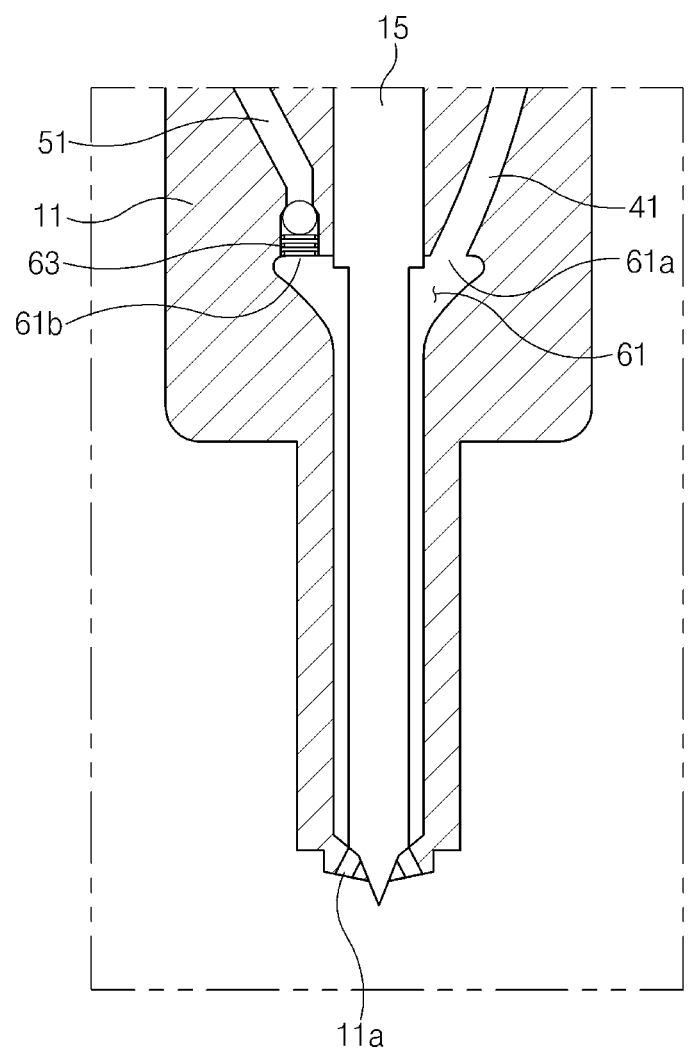
FIG. 3 illustrates an enlarged view of a portion indicated by arrow S in FIG. 2.

Referring to FIGS. 1 to 3, a fuel and water injection system 1, according to an exemplary form of the present disclosure, may include an injector 10 mounted on an engine 5, a fuel pump 21 supplying a fuel to the injector 10, and a water pump 31 supplying water to the injector 10.

An intake pipe 6 and an exhaust pipe 7 may be connected to the engine 5. A compressor 8a of a turbocharger and an intercooler 8c may be provided on the intake pipe 6, and a turbine 8b of the turbocharger may be provided on the exhaust pipe 7. An EGR pipe 9a may be connected between the exhaust pipe 7 and the intake pipe 6, and an EGR cooler 9b and an EGR valve 9c may be provided on the EGR pipe 9a. According to an exemplary form of the present disclosure, the EGR pipe 9a, the EGR cooler 9b, and the EGR valve 9c may be eliminated.

The injector 10 may include an injector body 11, a solenoid coil 12 which is mounted on the injector body 11, an armature 13 which is movable by electromagnetic force of the solenoid coil 12, a control chamber 14 which is formed below the armature 13, and a needle 15 which is movable between an opened position and a closed position by a fuel pressure change in the control chamber 14.

The injector body 11 may have a nozzle orifice 11a, and the nozzle orifice 11a may be formed at the bottom end of the injector body 11. The nozzle orifice 11a may be opened and closed by upward and downward movements of the needle 15. A control rod 16 may be connected to the top end of the needle 15. As the armature 13 moves upwardly and downwardly, the fuel pressure in the control chamber 14 may change, and the control rod 16 may move upwardly and downwardly according to the fuel pressure change in the control chamber 14. The control rod 16 and the needle 15 may move together upwardly and downwardly, and the needle 15 may be movable between the closed position in which the nozzle orifice 11a is closed and the opened position in which the nozzle orifice 11a is opened.

The injector body 11 may have a fuel supply port 17, a fuel passage 41 communicating with the fuel supply port 17, a water supply port 18, a water passage 51 communicating with the water supply port 18, and a pressure chamber 61 communicating with the fuel passage 41 and the water passage 51.

The fuel supply port 17 may communicate with a common rail 23, so that the fuel supply port 17 may receive high-pressure fuel which is supplied from the common rail 23. The fuel passage 41 may allow the fuel supply port 17 and the pressure chamber 61 to communicate with each other, so that the high-pressure fuel may be supplied from the fuel supply port 17 to the pressure chamber 61 through the fuel passage 41. A branch passage 41a branching from the fuel passage 41 may allow the fuel supply port 17 and the control chamber 14 to communicate with each other, so that the high-pressure fuel may be supplied from the fuel supply port 17 to the control chamber 14 through the branch passage 41a.

The water supply port 18 may communicate with the water pump 31, so that the water supply port 18 may receive the water which is supplied by the water pump 31. The water passage 51 may allow the water supply port 18 and the pressure chamber 61 to communicate with each other, so that the water may be supplied from the water supply port 18 to the pressure chamber 61 through the water passage 51.

The pressure chamber 61 may be formed in a lower portion of the injector body 11, and the pressure chamber 61 may communicate with the nozzle orifice 11a. The pressure chamber 61 may have a fuel inlet 61a to which the fuel passage 41 is connected, and a water inlet 61b to which the water passage 51 is connected. The fuel may flow into the pressure chamber 61 through the fuel inlet 61a, and the water may flow into the pressure chamber 61 through the water inlet 61b.

According to an exemplary form of the present disclosure, the injector 10 may further include a check valve 63 inhibiting or preventing the water from flowing back from the pressure chamber 61 to the water pump 31 or a return passage 65 of the injector 10. The check valve 63 may be mounted on a portion facing the water inlet 61b of the pressure chamber 61, so that it may inhibit or prevent the water from flowing back from the pressure chamber 61 to the water passage 51. For example, a space for mounting the check valve 63 may be formed at an end portion of the water passage 51 facing the water inlet 61b of the pressure chamber 61. By mounting the check valve 63 on the portion facing the water inlet 61b of the pressure chamber 61, the backflow of the water from the pressure chamber 61 to the water pump 31 or the return passage 65 of the injector 10 may be effectively inhibited or prevented.

The needle 15 may move in the pressure chamber 61 upwardly and downwardly, so that the needle 15 may move to the opened position to open the nozzle orifice 11a and move to the closed position to close the nozzle orifice 11a. A spring 15a may be disposed around the needle 15, and the spring 15a may urge the needle 15 downwardly.

The solenoid coil 12 may be mounted at the top end of the injector body 11 by a coil bobbin 12a. A spring 13b may be disposed in a cavity of the coil bobbin 12a to urge the armature 13 downwardly. The armature 13 may be disposed adjacent to the lower portion of the solenoid coil 12, and the bottom end of the spring 13b may contact the top surface of the armature 13 so that the armature 13 may be moved downwardly by a force of the spring 13b.

A valve block 14c may be mounted inside the injector body 11, and the valve block 14c may be downwardly spaced apart from the solenoid coil 12.

The control chamber 14 may be defined by the valve block 14c and the control rod 16, and the high-pressure fuel may flow into the control chamber 14 through the branch passage 41a so that the control chamber 14 may be filled with the high-pressure fuel. A drain chamber 14b may be disposed between the control chamber 14 and the solenoid coil 12, and the drain chamber 14b may be defined by the valve block 14c and a cavity of the injector body 11.

The valve block 14c may have a passage 14d allowing the control chamber 14 and the drain chamber 14b to communicate with each other, and a ball valve 13a may be formed at the bottom end of the armature 13, so that the movement of the armature 13 may allow the ball valve 13a to open and close the passage 14d of the valve block 14c.

As the ball valve 13a of the armature 13 opens and closes the passage 14d of the valve block 14c, the fuel pressure in the control chamber 14 may change. As the fuel pressure in the control chamber 14 changes, the control rod 16 and the needle 15 may move together upwardly and downwardly.

When the upward movement of the armature 13 allows the ball valve 13a of the armature 13 to open the passage 14d of the valve block 14c, the high-pressure fuel may be discharged from the control chamber 14 to the drain chamber 14b through the passage 14d, so that the fuel pressure in the control chamber 14 may be reduced, and the control rod 16 and the needle 15 may move upwardly. When the downward movement of the armature 13 allows the ball valve 13a of the armature 13 to close the passage 14d of the valve block 14c, the control chamber 14 may be filled with the high-pressure fuel, so that the fuel pressure in the control chamber 14 may be increased, and the control rod 16 and the needle 15 may move downwardly. As the fuel pressure in the control chamber 14 changes, an imbalance in the force applied to the control rod 16 and the needle 15 may occur, so that the control rod 16 and the needle 15 may move upwardly and downwardly and the needle 15 may open and close the nozzle orifice 11a.

The return passage 65 may be formed at the top end of the injector body 11. The return passage 65 may communicate with the drain chamber 14b, and the return passage 65 may be connected to the common rail 23 and the fuel tank 22 through a return pipe 66. As the armature 13 moves upwardly, the high-pressure fuel in the drain chamber 14b may return to the fuel tank 22 through the return passage 65 and the return pipe 66.

According to an exemplary form of the present disclosure, a middle chamber 19 may be elongated in the middle of the injector body 11. The middle chamber 19 may be disposed between the needle 15 and the control chamber 14, and the control rod 16 may be movable in the middle chamber 19 upwardly and downwardly. The middle chamber 19 may communicate with the drain chamber 14b through a connecting passage 19a, so that the high-pressure fuel in the drain chamber 14b may be supplied to the middle chamber 19 through the connecting passage 19a. As the high-pressure fuel received in the middle chamber 19 is positioned above the needle 15, the high-pressure fuel in the middle chamber 19 may inhibit or prevent the water and/or the fuel from rising through a fine gap between the needle 15 and a bore. Thus, the backflow of the water and/or the fuel to the return passage 65 of the injector body 11 may be reliably prevented.

The fuel pump 21 may pressurize the fuel sucked from the fuel tank 22 to high pressure and supply the high-pressure fuel to the common rail 23. The common rail 23 may accumulate the fuel at high pressure to maintain a relatively high target rail pressure so that the common rail 23 may supply the high-pressure fuel to the injector 10 through a fuel supply pipe 25.

An electronic control unit or engine control unit (ECU) 70 may be configured to control the engine 5, the injector 10, the fuel pump 21, and the common rail 23. The ECU 70 may include inputs and outputs which are connected to a variety of sensors, the engine 5, the injector 10, and the common rail 23, and a memory.

The ECU 70 may include any suitable microprocessor, microcontroller, personal computer, or the like, which has a central processing unit capable of executing a control program and data stored in the memory.

The water pump 31 may suck water from the water tank 32 and supply the water to the injector 10. A water supply pipe 35 may connect the water pump 31 and the water supply port 18 of the injector 10, and a solenoid shut-off valve 33 may be provided on the water supply pipe 35.

A water supply controller 80 may control the water pump 31 and the solenoid shut-off valve 33 to adjust a water supply flow rate and a water supply time. The water supply controller 80 may cooperate with the ECU 70.

The water supply controller 80 may control selective opening and closing of the solenoid shut-off valve 33 according to operating conditions of an engine, so that fuel injection mode and fuel and water injection mode may be selectively operated. In the fuel injection mode, the injector 10 may inject only the fuel at a predetermined injection pressure, and in the fuel and water injection mode, the injector 10 may inject the fuel and the water together at the predetermined injection pressure.

According to an exemplary form of the present disclosure, in a full load operating condition or an operating condition similar thereto in which the injection of water is not required, the water supply controller 80 may control the solenoid shut-off valve 33 to be closed so that the injector 10 may inject only the fuel according to an injection signal of the ECU 70 (the fuel injection mode), and in a partial load operating condition in which the injection of water is desired, the water supply controller 80 may control the solenoid shut-off valve 33 to be opened according to a predetermined cycle so that the injector 10 may inject the fuel and the water together according to an injection signal of the ECU 70 (the fuel and water injection mode). The ECU 70 may control the solenoid coil 12 to drive in accordance with a first duty cycle, irrespective of the fuel injection mode and the fuel and water injection mode.

The water supply controller 80 may include inputs and outputs which are connected to a variety of sensors, the water pump 31, and the solenoid shut-off valve 33, and a memory. The water supply controller 80 may include any suitable microprocessor, microcontroller, personal computer, or the like, which has a central processing unit capable of executing a control program and data stored in the memory.

As illustrated in FIG. 1, the water supply controller 80 may be a stand-alone device. Alternatively, the water supply controller 80 may be embedded in the ECU 70.

Figure 4:
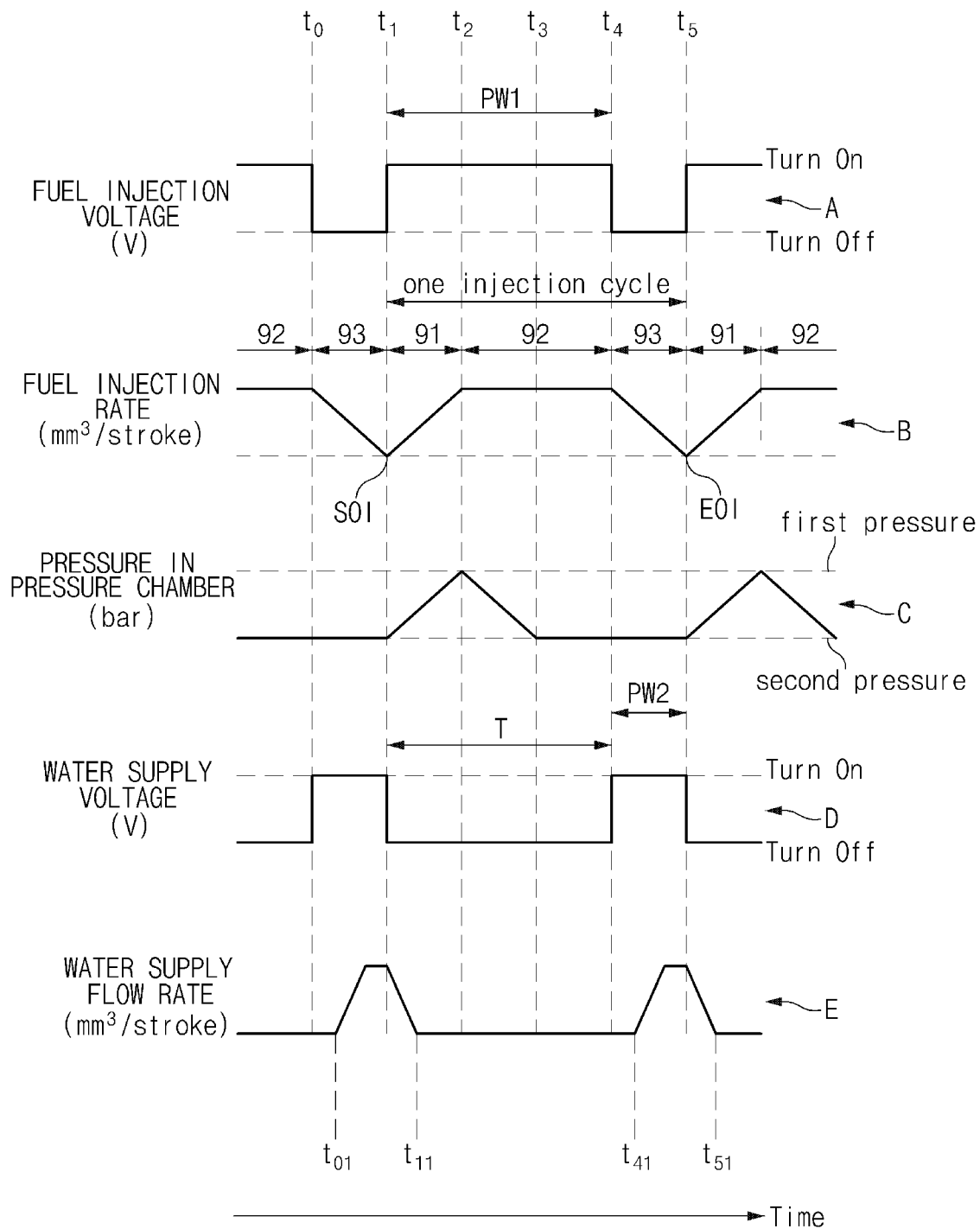
FIG. 4 illustrates a graph of relations of fuel injection voltage, fuel injection rate, pressure in a pressure chamber, water supply voltage, and water supply flow rate, when a fuel and water injection system according to an exemplary form of the present disclosure operates in fuel and water injection mode.

FIG. 4 illustrates a graph of relations of fuel injection voltage, fuel injection rate, pressure in pressure chamber, water supply voltage, and water supply flow rate, when the fuel and water injection system 1 operates in fuel and water injection mode.

Referring to FIG. 4, the ECU 70 may control the solenoid coil 12 of the injector 10 to be driven in accordance with a first predetermined duty cycle (see curved line A in FIG. 4). Thus, the solenoid coil 12 may be turned on during a first pulse width PW1 of the first duty cycle. When a predetermined voltage for fuel injection is applied to the solenoid coil 12, the needle 15 of the injector 10 may move upwardly to open the nozzle orifice 11a, so that the high-pressure fuel supplied to the pressure chamber 61 of the injector 10 may be injected through the nozzle orifice 11a. When the solenoid coil 12 of the injector 10 is turned on for a predetermined period of time (i.e., t1 to t4) as illustrated by curved line A in FIG. 4, the high-pressure fuel supplied to the pressure chamber 61 may be injected from the pressure chamber 61 of the injector 10 through the nozzle orifice 11a at a predetermined fuel injection rate for a predetermined period of time (i.e., t1 to t5) as illustrated by curved line B in FIG. 4.

One injection cycle includes a first injection period 91, a second injection period 92, and a third injection period 93. As illustrated by curved line B in FIG. 4, the first injection period 91 refers to a period in which the fuel injection rate gradually increases from the start of injection (SOI) to a peak fuel injection rate, the second injection period 92 refers to a period in which the fuel injection rate is maintained at a predetermined peak fuel injection rate, and the third injection period 93 refers to a period in which the fuel injection rate gradually decreases from the predetermined peak fuel injection rate to the end of injection (EOI). FIG. 4 illustrates the injection cycles as a continuous process, but there may be an injection interval between the injection cycles, and the injection interval may be referred to as pre-injection and post-injection.

As illustrated by curved line C in FIG. 4, a pressure in the pressure chamber 61 may gradually increase to the predetermined first pressure in the first injection period 91 (i.e., t1 to t2), gradually decrease to a predetermined second pressure that is lower than the predetermined first pressure and be kept constant at the predetermined second pressure in the second injection period 92 (i.e., t2 to t4), and be kept constant at the predetermined second pressure in the third injection period 93 (i.e., t4 to t5). The predetermined first pressure may correspond to the predetermined injection pressure. For example, the predetermined first pressure may be equal to or similar to the predetermined injection pressure.

Referring to FIG. 4, the water supply controller 80 may control the solenoid shut-off valve 33 to be driven in accordance with a second predetermined duty cycle (see curved line D in FIG. 4). Thus, the solenoid shut-off valve 33 may be turned on during a second pulse width PW2 of the second duty cycle. When a predetermined voltage for water supply is applied to the solenoid shut-off valve 33 for a predetermined period of time (i.e., t0 to t1 and t4 to t5), the solenoid shut-off valve 33 may be opened so that the water stored in the water tank 32 may be supplied to the pressure chamber 61. In detail, when the solenoid shut-off valve 33 is turned on for a predetermined period of time (i.e., t0 to t1 and t4 to t5) as illustrated by curved line D in FIG. 4, the water may be supplied to the pressure chamber 61 of the injector 10 at a predetermined water supply flow rate for a predetermined period of time (i.e., t01 to t11 and t41 to t51) as illustrated by curved line E in FIG. 4.

As illustrated in FIG. 4, an interval T between a fuel injection start timing t1 and a water supply start timing t4 may be substantially the same as a turn-off period (t1 to t4) of the solenoid shut-off valve 33. For example, the interval T between the fuel injection start timing t1 and the water supply start timing t4 may be the same as or slightly different from the turn-off period of the solenoid shut-off valve 33.

According to an exemplary form of the present disclosure, when the pressure in the pressure chamber 61 of the injector 10 is lower than the predetermined first pressure (i.e., t0 to t1 and t4 to t5), in other word, the pressure in the pressure chamber 61 is the predetermined second pressure, the water supply controller 80 may be configured to supply the water to the pressure chamber 61 of the injector 10. Thus, the water pump 31 may be allowed to supply the water to the pressure chamber 61 using a relatively lower pressure than that of the fuel pump 21, so a relatively inexpensive water pump may be applied.

Referring to curved lines A, D, and E in FIG. 4, the water supply controller 80 may turn on the solenoid shut-off valve 33 in the third injection period 93 of one injection cycle, so that the water pump 31 may be operated to supply a predetermined amount of water to the pressure chamber 61 for a predetermined period of time (i.e., t01 to t11 and t41 to t51). In other words, the water supply controller 80 may turn on the solenoid shut-off valve 33 (that is, the solenoid shut-off valve 33 is opened) during a turn-off period (i.e., t0 to t1 and t4 to t5) of the solenoid coil 12, so that the water stored in the water tank 32 may be supplied to the pressure chamber 61 by the operation of the water pump 31 for a predetermined period of time.

As illustrated in FIG. 4, the turn-on period (i.e., t1 to t4) of the solenoid coil 12 of the injector 10 and the turn-on period (i.e., t4 to t5) of the solenoid shut-off valve 33 may be continued to thereby determine one injection cycle.

The water may be supplied to the pressure chamber 61 in the third injection period 93 (i.e., t4 to t5) of one injection cycle, so that the predetermined amount of water may be received in the pressure chamber 61. The water received in the pressure chamber 61 may be injected together with the fuel supplied to the pressure chamber 61 according to the injection signal of the ECU 70 through the nozzle orifice 11a of the injector 10 in the first injection period 91 and the second injection period 92 of a next injection cycle.

As described above, after the water is received in the pressure chamber 61 in the third injection period 93 of one injection cycle, the fuel supplied to the pressure chamber 61 may be injected together with the water through the nozzle orifice 11a of the injector 10 in the first injection period 91 and the second injection period 92 of the next injection cycle. In other words, the supply of water and the injection of fuel and water may be performed in the third injection period 93 of one injection cycle, and the first injection period 91 and the second injection period 92 of the next injection cycle in a time series manner, so that the injection of fuel and water may be efficiently performed. For example, the water may be supplied to the pressure chamber 61 in the third injection period 93 of one injection cycle, and then the fuel may be accumulated or stacked on the water received in the pressure chamber 61 in the first injection period 91 and the second injection period 92 of the next injection cycle. As a result, a liquid column having alternate layers or a multi-layered liquid column of water and fuel is formed in the pressure chamber 61, so that the injection of water and fuel may be efficiently performed.

The backflow of the water received in the pressure chamber 61 in the EOI period may be inhibited or prevented by the check valve 63. In addition, the water received in the pressure chamber 61 may be injected together with the high-pressure fuel from the pressure chamber 61 through the nozzle orifice 11a by the pressure of the high-pressure fuel supplied to the pressure chamber 61 in the SOI and MI periods, so that the water remaining in the pressure chamber 61 may be inhibited or prevented from being leaked to the return passage 65 through the fine gap between the needle 15 and the bore of the injector body 11.

The first pulse width PW1 of the first duty cycle may be greater than the second pulse width PW2 of the second duty cycle. For example, a ratio of the first pulse width PW1 of the first duty cycle and the second pulse width PW2 of the second duty cycle may range from 7:3 to 9:1. In one form, the ratio of the first pulse width PW1 of the first duty cycle and the second pulse width PW2 of the second duty cycle may be 7:3.

Figure 5:
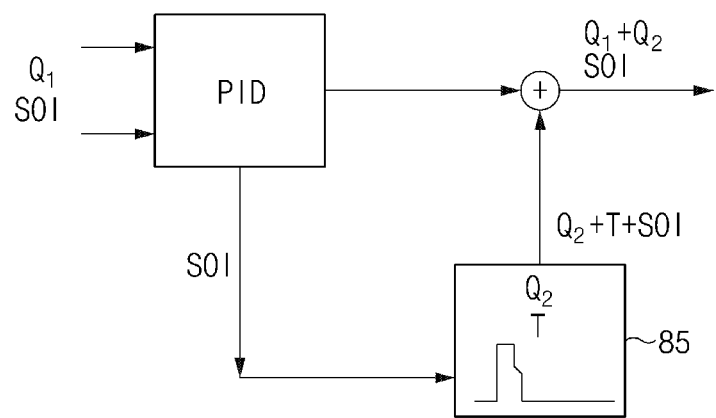
FIG. 5 illustrates a logic for determining a water supply flow rate according to a fuel injection rate and the start of injection (SOI) of one injection cycle in a fuel and water injection system according to an exemplary form of the present disclosure.

FIG. 5 illustrates logic for determining a water supply flow rate according to a fuel injection rate and the start of injection (SOI) of one injection cycle.

As illustrated in FIG. 5, when a fuel injection rate Q1 and SOI are input from the ECU 70 to the memory of the water supply controller 80, the water supply controller 80 may determine a water supply flow rate Q2 and an interval T between the fuel injection start timing t1 and the water supply start timing t4 based on a water supply map 85. The water supply map 85 may be stored in the memory of the water supply controller 80. The water supply map 85 may include the water supply flow rate Q2 mapped according to SOI of one injection cycle, and the interval T between the fuel injection start timing t1 and the water supply start timing t4, and the water supply map 85 may be provided in any one of a lookup table and a graph.

Figure 6:
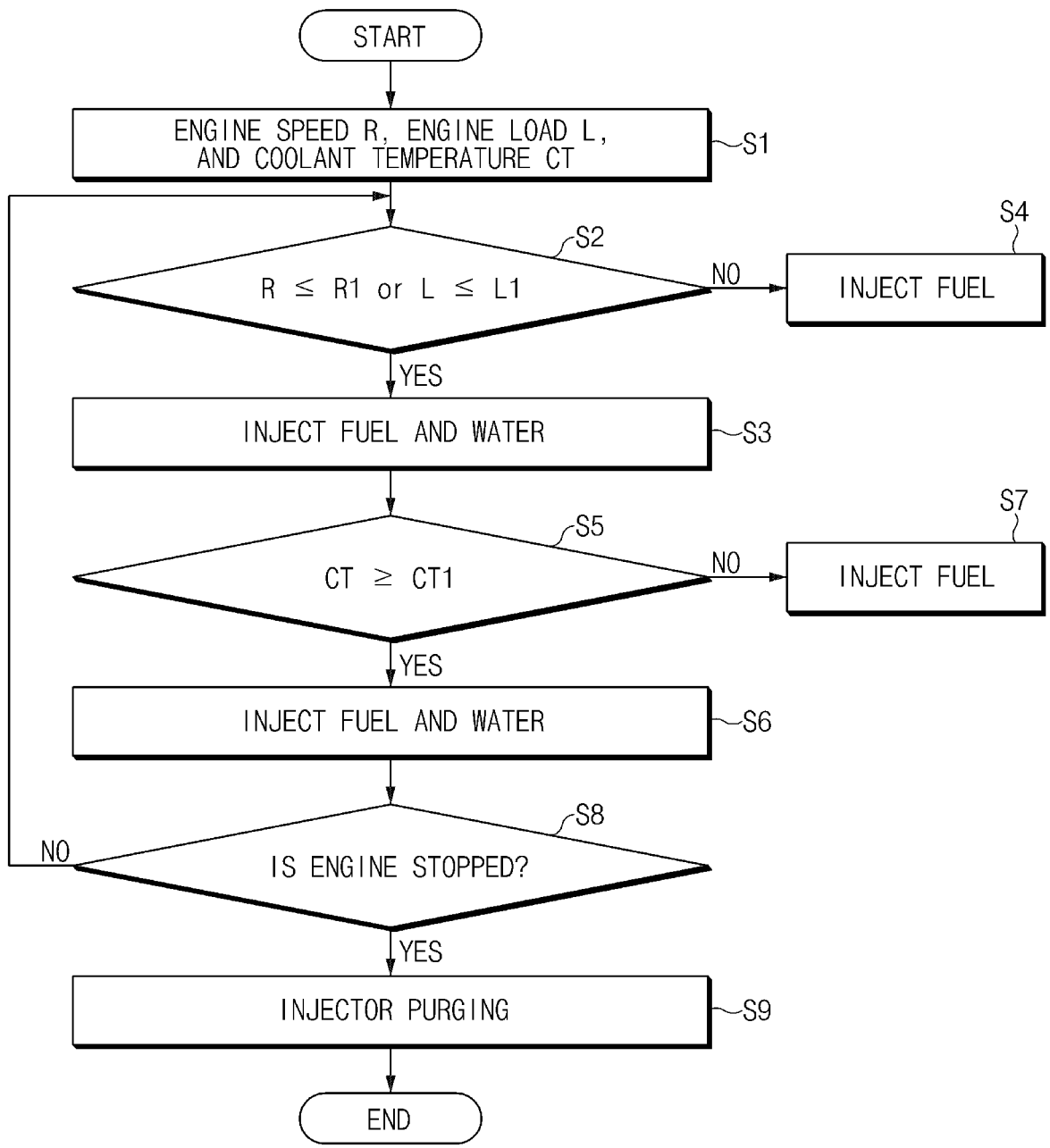
FIG. 6 illustrates a flowchart of a method for controlling a fuel and water injection system according to an exemplary form of the present disclosure.

FIG. 6 illustrates a flowchart of a method for controlling a fuel and water injection system according to an exemplary form of the present disclosure.

The ECU 70 may receive various information, such as engine speed R, engine load L, and coolant temperature CT, from various sensors while the engine is operating (S1).

According to an exemplary form of the present disclosure, in a full load operating condition or an operating condition similar thereto in which the injection of water is not required, the water supply controller 80 may control the solenoid shut-off valve 33 to be closed so that the injector 10 may inject only the fuel according to an injection signal of the ECU 70 (fuel injection mode), and in a partial load operating condition in which the injection of water is desired, the water supply controller 80 may control the solenoid shut-off valve 33 to be opened according to a predetermined cycle so that the injector 10 may inject the fuel and the water together according to an injection signal of the ECU 70 (fuel and water injection mode).

The ECU 70 may determine whether the engine speed R is lower than or equal to a first predetermined speed R1 or the engine load L is lower than or equal to a first predetermined load L1 (S2). The first predetermined speed may be an upper limit for engine speed at which the injection of water is desired. For example, the first predetermined speed may be 1500 RPM. The first predetermined load may be an upper limit for engine load at which the injection of water is desired. For example, the first predetermined load may be 10 bar.

Figure 7:
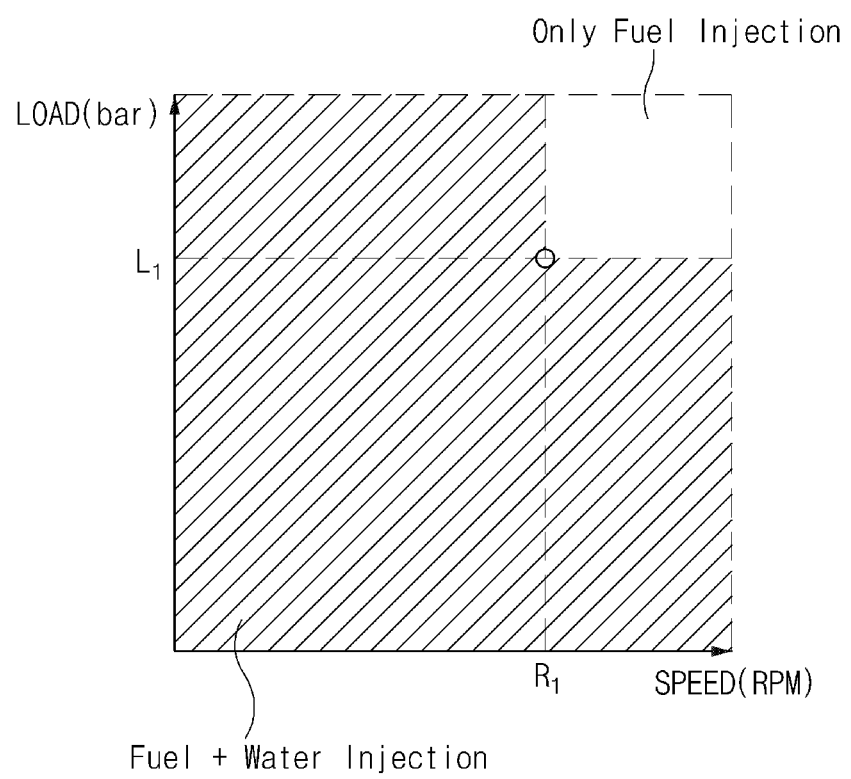
FIG. 7 illustrates a graph of characteristics of fuel injection mode and characteristics of fuel and water injection mode in a fuel and water injection system according to an exemplary form of the present disclosure.

When the engine speed R is lower than or equal to the first predetermined speed R1 or the engine load L is lower than or equal to the first predetermined load L1 (R≤R1 or L≤L1), the water supply controller 80 may turn on the water pump 31 and operate the solenoid shut-off valve 33 according to the second duty cycle (see curved line D in FIG. 4), and the ECU 70 may operate the solenoid coil 12 of the injector 10 according to the first duty cycle (see curved line A in FIG. 4). Thus, the fuel and water injection system may operate in the fuel and water injection mode (see FIG. 7) in which the injector 10 injects the fuel and the water together (S3).

When the engine speed R exceeds the first predetermined speed R1 or the engine load L exceeds the first predetermined load L1 (R>R1 and L>L1), the water supply controller 80 may turn off the water pump 31 and close the solenoid shut-off valve 33 so that the water stored in the water tank 32 may not be supplied to the injector 10, and the ECU 70 may drive the solenoid coil 12 of the injector 10 in accordance with the first duty cycle (see curved line A in FIG. 4). Thus, the fuel and water injection system may operate in the fuel injection mode (see FIG. 7) in which the injector 10 injects only the fuel according to the injection signal of the ECU 70 (S4).

The ECU 70 may determine whether the coolant temperature CT is is greater than or equal to than a predetermined temperature CT1 (S5). The predetermined temperature CT1 may be a lower limit for coolant temperature in order to determine an operating condition in which the injection of water is not required, such as cold start. For example, the predetermined temperature CT1 may be 55° C.

When the coolant temperature CT is greater than or equal to than the predetermined temperature CT1 (CT≥CT1), the water supply controller 80 may turn on the water pump 31 and drive the solenoid shut-off valve 33 in accordance with the second duty cycle, and the ECU 70 may drive the solenoid coil 12 of the injector 10 in accordance with the first duty cycle. Thus, the fuel and water injection system may operate in the fuel and water injection mode (see FIG. 7) in which the injector 10 injects the fuel and the water together (S6).

When the coolant temperature CT is lower than the predetermined temperature CT1 (CT<CT1), the water supply controller 80 may turn off the water pump 31 and close the solenoid shut-off valve 33 to thereby block the supply of water stored in the water tank 32 to the injector 10, and the ECU 70 may drive the solenoid coil 12 of the injector 10 in accordance with the first duty cycle (see curved line A in FIG. 4). Thus, the fuel and water injection system may operate in the fuel injection mode (see FIG. 7) in which the injector 10 injects only the fuel according to the injection signal of the ECU 70 (S7).

Then, the ECU 70 may determine whether the engine is stopped (S7).

When the engine is stopped, the water supply controller 80 may turn off the water pump 31 and close the solenoid shut-off valve 33 to thereby block the supply of water stored in the water tank 32 to the injector 10, and the ECU 70 may drive the solenoid coil 12 of the injector 10 in accordance with the predetermined duty cycle to thereby allow the purging of fuel and water from the injector 10 (S8). Thus, the fuel and the water remaining in the injector 10 may be discharged.

As set forth above, the fuel and water injection system and the method for controlling the same, according to exemplary forms of the present disclosure, can reduce NOx emissions and improve combustion performance by selectively injecting fuel alone or injecting fuel and water together according to operating conditions.

In addition, according to exemplary forms of the present disclosure, by mounting the check valve on the portion facing the water inlet of the pressure chamber, the backflow of water from the pressure chamber to the water pump or the return passage of the injector can be effectively reduced or prevented.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A fuel and water injection system for an internal combustion enqine, the system comprising: an injector disposed within a cylinder of the engine, the injector having a needle which is movable upwardly and downwardly by a solenoid coil, a nozzle orifice which is opened and closed by upward and downward movements of the needle, and a pressure chamber communicating with the nozzle orifice; a fuel pump supplying a fuel to the pressure chamber of the injector; a water pump supplying water to the pressure chamber of the injector; a solenoid shut-off valve disposed on a water supply pipe connecting the water pump and the pressure chamber of the injector; an engine control unit configured to control the fuel pump and the injector; a water supply controller configured to control the water pump and the solenoid shut-off valve, wherein the water supply controller is configured to selectively open and close the solenoid shut-off valve based on operating conditions of an engine, so that the fuel and water injection system selectively operates in a fuel injection mode in which the injector injects only the fuel, or in a fuel and water injection mode in which the injector injects the fuel and the water together; wherein the engine control unit is configured to drive the solenoid coil based on a first predetermined duty cycle, and the water supply controller is configured to drive the solenoid shut-off valve based on a second predetermined duty cycle; wherein the water supply controller is configured to turn on the solenoid shut-off valve during a turn-off period of the solenoid coil; and wherein a pulse width of the first predetermined duty cycle is greater than a pulse width of the second predetermined duty cycle.

2. The system according to claim 1, wherein the water supply controller is configured to supply the water to the pressure chamber when a pressure in the pressure chamber is lower than a predetermined injection pressure.

3. The system according to claim 1, wherein one injection cycle of the injector includes a first injection period in which a fuel injection rate increases, a second injection period in which the fuel injection rate is maintained at a predetermined peak fuel injection rate, and a third injection period in which the fuel injection rate decreases, wherein when the fuel and water injection system operates in the fuel and water injection mode, the water supply controller is configured to open the solenoid shut-off valve in the third injection period so that the water is supplied to the pressure chamber in the third injection period, and wherein the engine control unit is configured to drive the solenoid coil of the injector based on a first predetermined duty cycle so that the water supplied to the pressure chamber is injected together with the fuel supplied to the pressure chamber through the nozzle orifice of the injector in the first injection period and the second injection period of a next injection cycle.

4. The system according to claim 1, further comprising: a check valve inhibiting or preventing the water from flowing back from the pressure chamber to the water pump, wherein the check valve is disposed between the pressure chamber and the water pump.

5. The system according to claim 4, wherein the pressure chamber has a fuel inlet and a water inlet, and the check valve is mounted on a portion facing the water inlet.

* * * * *